April 11, 1967 C. H. BECKER 3,314,073

LASER RECORDER WITH VAPORIZABLE FILM

Filed Oct. 20, 1964 2 Sheets-Sheet 1

INVENTOR.

CARL H. BECKER

BY Townsend and Townsend

ATTORNEYS

INVENTOR.
CARL H. BECKER
BY
Townsend and Townsend
ATTORNEYS

United States Patent Office 3,314,073
Patented Apr. 11, 1967

3,314,073
LASER RECORDER WITH VAPORIZABLE FILM

Carl H. Becker, Palo Alto, Calif., assignor to Precision Instrument Company, Palo Alto, Calif.
Filed Oct. 20, 1964, Ser. No. 405,298
5 Claims. (Cl. 346—76)

ABSTRACT OF THE DISCLOSURE

A system for recording data at frequencies in the megacycle regions employing a film having a black coating and a laser arranged to project modulated thermal energy onto the film to thereby cause the removal of bits of the coating in proportion to the modulated laser thermal energy, which further incorporates diffraction limited optics of a short focal length to thereby project diminutive recorded bits by thermal evaporation.

This application is a continuation-in-part of application Ser. No. 374,532, filed June 11, 1964, now abandoned.

The present invention relates in general to a light recording system utilizing coherent optical energy as the recording source to produce an instantaneously reproducible record with a diffraction limited bit size.

Existing recording techniques, magnetic, photographic, and electron-beam recording, suffer from a number of deficiencies. The major deficiencies with magnetic recording are the one dimensional recording principle and the limited recording speed which stems from the necessity for mechanical connection between the recording head and the recording medium. These limitations present themselves both in the recording and the reproduction processes. Additionally, due to the mechanical connection a certain amount of wear of the recording head and medium results during the recording and reproducing operations which limits the life of the recording.

In photographic recording, while the recording operation can be performed at the speed of light with no contact between the recording source and the recording medium, the necessary developing process prohibits the use of such recording processes in applications where instantaneous reproducing is required.

Electron beam recording must take place within a vacuum which places severe environmental and fabrication limitations on the process and prohibits instantaneous readout.

The object of the present invention is to provide a recording and reproducing system which permits recording of a maximum amount of information in the shortest time possible with provision for instantaneous reproduction during the recording process.

Broadly stated, the present invention to be described in greater detail below is directed to a recording system utilizing a continuous wave beam of coherent light, means for modulating the intensity of the light beam with the information to be recorded and a transparent film carrier having a substantially uniform density vaporizable opaque coating on one surface. Relative registration is effected between the film carrier and the beam while the beam is focused to the minimum size on the carrier coating. The intensity of the beam and the thickness of the carrier coating are such that the modulated intensity of the focused beam spot varies from a level which is insufficient to remove the opaque coating from the film carrier up to a level where the opaque coating is sufficiently removed so that light is at least partially transmitted through the carrier without destruction of the carrier.

This invention permits two-dimensional recording of information on a recording medium in minimum bit size, the ultimate minimum limit of the bit size of the system being equal to the diffraction limits of the system or on the order of the wave length of the coherent light utilized for recording. This minimum bit size permits a maximum packing density of information such as on the order of a million bits per square centimeter when coherent ultraviolet light is utilized.

Since the recording system in accordance with the present invention is free from mechanical connection between the recording element or source and the recording medium, the recording and reproducing speeds are determined only by the diffraction limits of the coherent light system and the coherent beam power as contrasted with magnetic recording systems which are limited in speed by the mechanical connection between the recording medium and the transducer as well as the one-dimensional recording principle and with photographic recording systems which are limited by the developing process. In the present invention there is neither the necessity for avoiding solarization as in a photographic process nor the requirement for use of a vacuum chamber as in an electron beam process. Additionally, in the system in accordance with the present invention the recording medium is separated from the recording and reading source without loss of information density.

The system of the present invention not only provides the minimum bit size and maximum packing density at high recording speeds but also permits simultaneous reproduction during the recording process.

Another feature and advantage of the present invention lies in the fact that the coherent light recording system provides the maximum obtainable irradiance for data recording and readout since the recording and reading irradiance are proportional to the reduction ratio of the coherent light beam cross-section to that of the recorded bit.

Other objects, features and advantages of the present invention will become apparent upon reading the following specification and referring to the accompanying drawing in which similar characters of reference represent corresponding parts in each of the several views.

Figure 1:
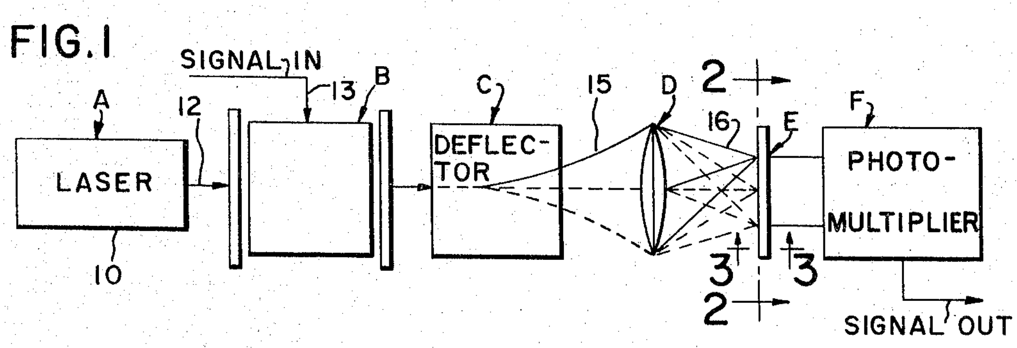
FIG. 1 is a schematic diagram illustrating a recording system in accordance with the present invention.
Figure 2:
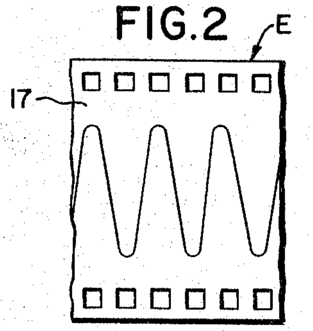
FIG. 2 is a schematic view of a recording produced in accordance with the system illustrated in FIG. 1 viewed along line 2—2.
Figure 3:
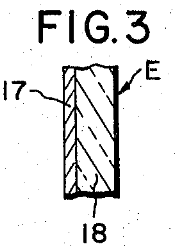
FIG. 3 is an enlarged sectional view of a portion of the structure shown in FIG. 1 taken along line 3—3 in the direction of the arrows.

Referring now to the drawing with particular reference to FIGS. 1–3 there is illustrated a high speed recording system in accordance with the present invention which can produce a diffraction limited bit size for the recorded information while permitting instantaneous reproduction of the recording. The system includes a beam of continuous wave coherent light from an optical maser or laser schematically illustrated at A as the recording source for recording information on a recording medium E by vaporizing diffraction limited portions of a substantially uniform density opaque coating on a transparent film carrier.

The optical maser or laser A generates a beam of coherent light 12 and as illustrated includes a lasing medium 10 such as, for example, a helium neon gas laser source. Obviously any type of laser, solid, liquid, or gaseous, can be utilized in performing the present invention, preferably a laser operating in a single-mode. However, as will become more apparent in the following description, since the minimum bit size obtainable depends upon the wavelength of the coherent light produced with the laser, shorter wavelength light such as, for example, ultraviolet light is preferred in the practice of this invention.

The coherent light beam produced by the laser A is intensity modulated in a modulator B with the information to be recorded applied thereto from a signal input 13. The signal modulator B can be any light intensity modulator such as, for example, a Kerr cell or Pockels cell, which will modulate the intensity of the continuous wave coherent light beam 12 with information to be recorded. The variation in the intensity of the laser beam is at least from a level which does not remove the opaque coating from the recording medium E sufficiently to permit light transmission through the medium E up to a level at which the laser beam removes the opaque coating from the recording medium E so that light is at least partially transmitted through the medium without destruction of the medium.

In order to obtain the maximum packing density of bits of information on the recording medium the intensity modulated laser beam 14 is swept across the recording medium E by a sweep deflector C. The deflector C can include rotating mirrors or prisms or multiple lenses or preferably for maximum packing density any electro-optical, magneto-optical or other non-mechanical means such as, for example, a potassium-tantalum-niobium oxide having the character of a perovskite. The electro-optical and magneto-optical deflection processes can be characterized as electric or magnetic double-refraction induced in a prism (or cascade of prisms) of transparent electric or optical materials as a function of the applied electric or magnetic field, respectively. The deflector C produces a linearly swept intensity modulated beam 15 which is then focused by a focusing lens D onto the recording medium E which is driven past the lens D transverse to the direction of sweep by means of a conventional drive mechanism such as, for example, a continuous motion picture camera drive (not shown). The lens C can be the objective lens of a movie camera in which the film drive is utilized to drive the recording medium. As illustrated in FIG. 2 the focused linearly swept beam 16 traces a sinusoidal path across and along the length of the recording medium E. In one typical embodiment of the present invention the encoding and decoding deflection by the deflector C conforms to the FCC television frequency of 4.5 mc./sec. and dynamic range standards so that the recorded information can be transmitted via FCC microwave networks.

The recording medium E is made up of a transparent film carrier 17 which is provided with a thin opaque coating 18 on the side facing the swept modulated laser beam 16. The carrier 17 can be any transparent film such as, for example, cellulose nitrate or acetate or plastic, and the coating any appropriate opaque layer of uniform density such as, for example, a developed silver halide gelatin photographic emulsion, or a dyed gelatin. The opaque coating must be as absorptive as possible with as little reflectivity as possible. Metals are good absorbers but also good reflectors. Hence ordinary thin films of absorptive material such as gold, silver, germanium, silicon, etc. are not suitable since they reflect most of the light and absorb only a small part of the light. However, these metals in suspension or in a dispersion such as, for example, gold black are suitable. India ink which is highly dispersed carbon can also be used.

In order to permit recording of information in the minimum bit size with the focused diffraction limited laser beam 16 on the coating 18, the thickness of the coating

18 is selected in accordance with the available irradiance from the laser and the modulation of the laser such that the maximum intensity of the focused laser beam is sufficient to cause vaporization of the coating whereby the coating becomes at least partially transparent to light but insufficient to cause destruction of the film carrier. Ideally the thickness of the film is selected with respect to the modulated intensity of the focused laser beam 16 such that the maximum intensity of the beam entirely vaporizes a diffraction limited spot in the coating 18 to transmit light into and through the carrier 17 without destroying the carrier 17 and such that the minimum intensity of the focused laser beam 16 is insufficient to remove the coating 18 to permit transmission of light into the carrier 17.

One particular advantage of the present recording system lies in the fact that the recording may be simultaneously displayed or reproduced while the recording is being made. Thus, as illustrated in FIG. 1 the reproducing system includes means for detecting the amount of light transmitted through the recording medium during the recording process. This means can include a photomultiplier 21 located on the opposite side of the recording medium E from the modulated recording laser beam 16 for detecting the amount of light transmitted through the recording medium at the same time the recording is being made. The signal picked up by the photo-multiplier 21 is demodulated in the same manner as the input signal 13 is modulated and the output signal 22 from the photomultiplier displayed in any desired manner.

Of course, light transmission through the carrier 17 is relative depending upon the transmissivity of the coating 18 so that instead of passing absolutely no light through the carrier coating 18, in practice, a certain amount of light may be transmitted through the coating and the operating threshold of the photomultiplier 21 adjusted to detect only the modulation of the laser beam. Therefore, the words "opaque" and "transparent" are used herein and in the claims to include the situation of relative transmission, i.e., where a certain amount of light is transmitted through the opaque coating.

While "vaporization" has been used heretofore and will be used hereinafter in the specification and claims to designate the action of the focused laser beam in removing portions of the coating 18 from the carrier 17, it is envisioned that under certain circumstances with certain coatings a chemical reaction might take place in the presence of the laser beam to produce a transparent portion of the coating 18 or removal of material in the area on which the laser beam is focused without creation of a vapor. Therefore, the term "vaporization" is utilized herein and hereinafter to define any process whereby the area on which the laser beam is focused is caused to change from having an opaque or only slightly transmissive characteristic to having a much higher light transmission characteristic.

As pointed out above, the focused laser beam produces a diffraction limited spot which permits minimum information bit size and maximum information packing density. The theory of optical diffraction actually governs the entire coherent light process from the generation of the light beam within the laser to the focusing upon the recording medium as well as during the readout process up to the photodetector. On the basis of Kirchhoff's theorem the mathematical conditions for the diffraction limit of a coherent light beam are determined by the collimation angle $\alpha$ by $$\sin \alpha \approx \alpha = 1.22 \frac{\lambda}{\eta \sin \gamma}$$

where $\lambda$ is the wavelength of the light beam and $\eta \sin \gamma$ is the numerical aperture of the laser.

The same diffraction limits govern the focusing process of the coherent light beam determining the resolving power of the optical system which means the minimum obtainable bit size D:

$$D=1.22\lambda\left(\frac{f}{o}\right)$$

where $f$ is the focal length of the focusing lens and $o$ is the aperture of the laser. For a focusing system with a lens of $f=1$ cm. and laser aperture $o=1$ cm. the minimum obtainable bit size of minimum spot diameter is 1.22 times the laser wavelength. In such a case for red light such as produced with a helium-neon gaseous laser with a wavelength equal to approximately 0.63 micron the minimum obtainable bit size would be $D=0.75$ micron, and with ultraviolet light with a wavelength on the order of 0.21 micron the minimum bit size would be 0.25 micron. An ultraviolet coherent light beam can be produced in a laser of the type described in my copending United States patent application entitled, "Laser," Ser. No. 336,095, filed Dec. 23, 1963, and operable by electro-photo-thermo-luminescence.

In one typical example the recording medium utilized to record by vaporization of an opaque coating was 16 mm. Kodak Positive Reversal film which had been exposed to sunlight and developed to a minimum density of 3.0 in a fine grain developer so that while the total film thickness including the carrier 17 and coating 18 was 6.6 mils, the thickness of the developed emulsion or coating 18 was only 0.8 mil. Utilizing a Beaulieu R C 16 mm. camera for driving the carrier 17 and with a 10 mm. focal length 1.6 Switar lens for focusing the laser beam it was possible to evaporate a 3.5 to 4 micron spot on the developed emulsion during an exposure time of 1/100 second with an irradiance (incident radiant energy per unit time per unit area) of 39,600 watts /cm.$^2$ at a wavelength of 0.63 micron. With this system it is possible to record at 800 cycles per second and a carrier speed of 1 inch per second. In order to record at 4.5 megacycles/sec. as pointed out above with 5 bits per cycle the bit time is 44 nanoseconds. With the development of more powerful lasers the required laser output at a wavelength of .25 micron for producing a 1 micron spot diameter on this same film at the 4.5 mc./sec. recording rate with a carrier speed of 1 inch per second will be approximately 12.2 watts.

The amount of coherent light power necessary to produce the desired vaporization from a given coating thickness can be reduced by heating the emulsion in the region of the focused spot.

Figure 4:
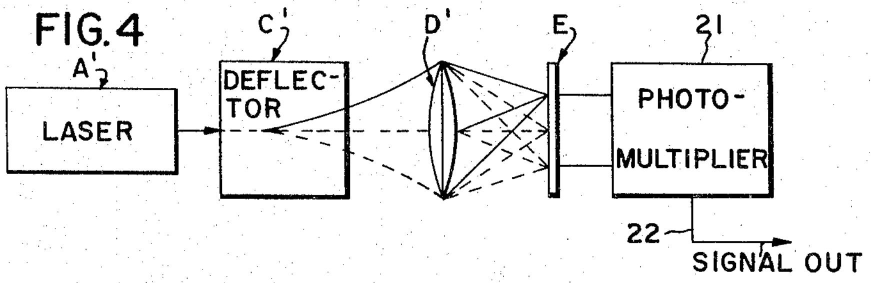
FIG. 4 is a schematic view illustrating a reproducing system for reproducing the recording produced in accordance with the system illustrated in FIG. 1.

Instead of the instantaneous reproduction as illustrated on FIG. 1 a secondary or subsequent reproduction can be produced by the apparatus illustrated in FIG. 4 which includes a separate optical maser of low power for generating a coherent light beam which is deflected in the same manner as during the recording process, focused onto the recorded trace on the film utilizing a servo for passage through the carrier 17 to be picked up in a photo multiplier 21 for reproduction in the same manner as described above with respect to the instantaneous reproduction. In the case of a secondary reproduction, the laser power is less than the laser power during the recording operation so that the recording medium is unaffected by the coherent light focused thereon but a diffraction limited spot is produced by the laser to transmit light through the recording medium in variable accordance with the transmissivity of the carrier coating produced during the recording operation.

Figure 6:
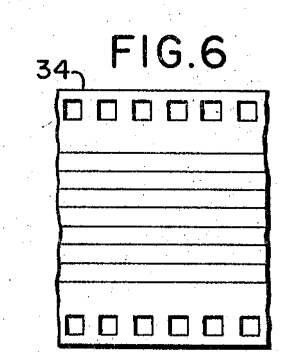
FIG. 6 is a schematic illustration of the recording produced with the system illustrated in FIG. 5.
Figure 5:
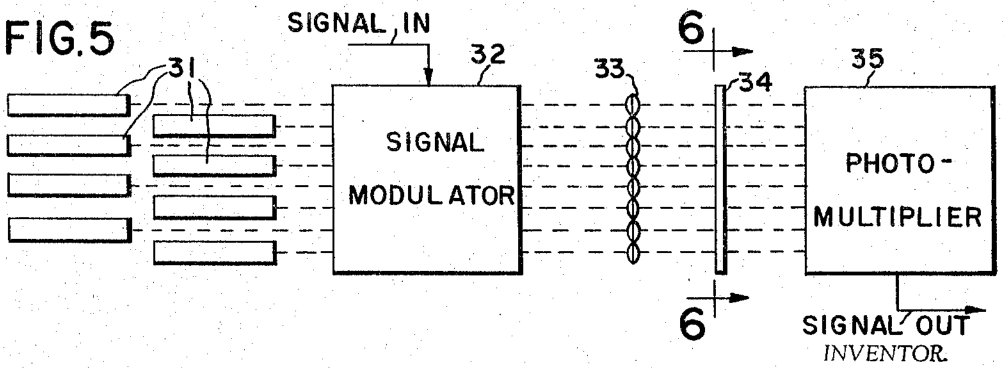
FIG. 5 is a schematic view illustrating an alternative recording system in accordance with the present invention.

An alternative embodiment of the present invention is illustrated in FIG. 5 where a number of coherent light generators 31 are utilized to provide a plurality of recording channels. The laser beams produced in the lasers 31 are intensity modulated in the signal modulator 32 with the desired information and focused by means of the lens 33 onto the recording medium 34 which is transported transversely to the plane containing the several modulated beams so that a plurality of traces are made on the recording medium by the several modulated beams as illustrated in FIG. 6. The recording is accomplished by vaporization of a coating on the carrier in the same manner as described above with respect to FIGS. 1–4 and can be reproduced with the photo-multiplier 35.

The present invention can be utilized for recording information obtained in a variety of different ways. For example, one typical application is the simultaneous recording of the output waves from an array of detection instruments arranged for seismic surveying. An array of such detectors is illustrated in my U.S. Patent No. 2,295,138. With information transmitted from a plurality of spaced locations a global seismic presentation can be made.

Another use for the present invention is in a banking system for maintaining individual records of depositors' accounts. In this case each depositor can be designated by a frame on a 16 mm. film strip or a film patch on a card locatable by random access, and deposits and withdrawals recorded by the recording method described herein.

Figure 7:
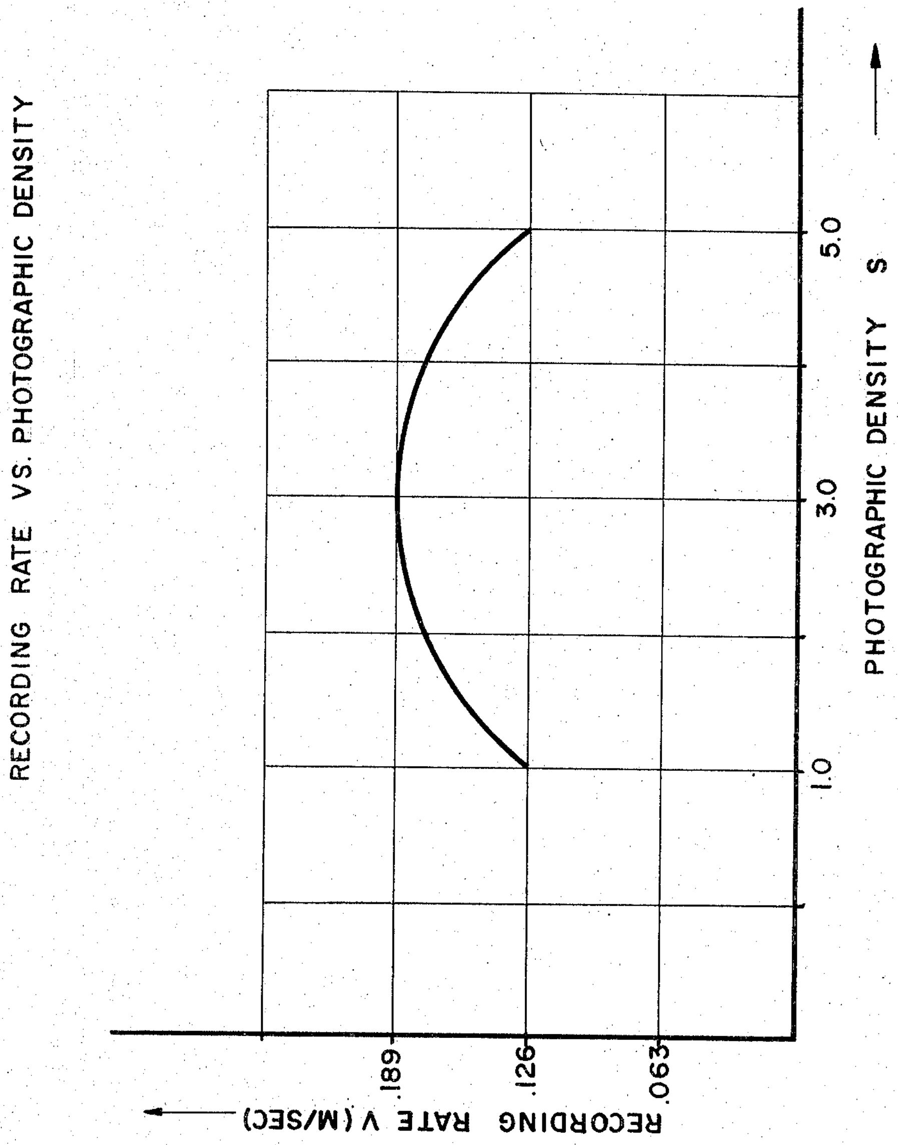
FIG. 7 is a graph of recording rate vs. photographic density of a unidensity film.

In another typical example of the recording system such as described with reference to FIGS. 1–4 the recording medium utilized was 16 mm. Kodak microfilm recordak SO 267 which had been exposed to ultraviolet light from an 18 watt Pek lamp for about 1/60 sec. and developed for four minutes to a density of 3.0 in Kodak D–76 fine grain developer. The developed film had a total overall thickness of approximately 167 microns, and the developed emulsion itself had a thickness of approximately 5 microns but with the silver particles distributed in a thickness corresponding to the skin depth of ultraviolet light which was approximately one micron. A laser beam from a Spectra-Physics Model 116 helim-neon gas laser having a .63 micron wavelength output of 20 mw. intensity modulated with desired information was focused with a 10 mm. focal length 1.6 Switar lens to a diameter of approximately 3 microns and swept across the film with a rotating mirror system. With this system it is possible to record at 62 kilocycles per second with readout capabilities of at least 100 times that value or at FCC standards of 6.2 megacycles. It is expected that in a short time a ruby laser will be available with a single mode continuous wave output of the required two watt power for this particular system to meet FCC TV broadcasting standards of 6.2 megacycles. The results of tests made with films of different densities are shown in FIG. 7 which is a graph of recording rate plotted against film photographic density. It was found that a density of about 3 was most desirable.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. A system for high density or megacycle frequency recording of information comprising: a film substrate having mounted thereon a black thin thermally vaporizable coating having a higher factor of thermo-optical absorbency than both thermo-optical reflectivity and transparency, a single mode laser adapted to provide a single wavelength laser beam, means intensity modulating said laser in response to predetermined information, means focusing said laser on said coating, means moving said film past the point of impingement of said laser beam thereon, said modulating means limiting the maximum intensity of said beam at a point which will cause the coating to be removed due to thermo-optical energy absorption and below the level which will cause destruction of said substrate due to thermo-optical absorption thereby.

2. A system for high density recording of information according to claim 1 and wherein said film and coating comprises a motion picture film type substrate and said coating comprises a black developed photographic emulsion.

3. A system for high density recording of information according to claim 1 and wherein said flexible coating comprises a black india ink emulsion.

4. A system for recording high density or high frequency information comprising: a film substrate having mounted thereon a thin thermally vaporizable coating having a higher factor of thermo-optical absorbency and a substantially lower factor of reflectivity and transparency, a single mode laser, means intensity modulating said laser beam in response to predetermined information, lens means constructed and arranged for focusing said laser beam on said coating at near diffraction limits, means moving said film past the point of impingement of said laser beam thereon, said lens means being of a sufficiency small focal length to limit the size of the laser beam image impinged upon said coating to near its smallest possible diameter as determined by the formula $$D = 122\lambda\left(\frac{f}{o}\right)$$

where D is the diffraction limited minimum obtainable bit size, $\lambda$ is the wavelength of the light beam, $o$ is the laser aperture, and $f$ is the focal length of the lens means, said laser beam being of sufficient thermo-optical intensity to cause sufficient heat absorption within said coating to cause the removal of a portion of said coating limited to the size of the laser beam thereupon.

5. A system for recording high density or high frequency of information according to claim 1 and having means to optically sense the areas of removed coating after laser beam impingement thereon.

References Cited by the Examiner

UNITED STATES PATENTS

| | | | |
|---|---|---|---|
| 3,154,370 | 10/1964 | Johnson | 346—108 |
| 3,154,371 | 10/1964 | Johnson | 346—108 |
| 3,175,196 | 3/1965 | Lee et al. | 346—77 X |
| 3,181,170 | 4/1965 | Akin | 346—108 |
| 3,256,524 | 6/1966 | Stauffer | 346—76 |

RICHARD B. WILKINSON, *Primary Examiner.*

LOUIS J. CAPOZI, *Examiner.*

J. W. HARTARY, *Assistant Examiner.*